United States Patent [19] [11] 4,068,049
Naruishi et al. [45] Jan. 10, 1978

[54] ALKALINE DRY CELL

[75] Inventors: Tadayuki Naruishi, Tokyo; Youichi Kataoka, Yokohama; Kazutaka Sue, Kawasaki, all of Japan

[73] Assignee: Toshiba Ray-O-Vac Co., Ltd., Tokyo, Japan

[21] Appl. No.: 732,338

[22] Filed: Oct. 14, 1976

[30] Foreign Application Priority Data

Oct. 14, 1975 Japan ............................... 50-123537
Feb. 20, 1976 Japan ............................... 51-17555
Apr. 15, 1976 Japan ............................... 51-42794
Apr. 23, 1976 Japan ............................... 51-46300

[51] Int. Cl.$^2$ ............................................. H01M 6/06
[52] U.S. Cl. ................................... 429/206; 429/219; 429/229
[58] Field of Search ............... 429/219, 229, 206, 231; 204/2.1, 130

[56] References Cited

U.S. PATENT DOCUMENTS 2,615,930 10/1952 Moulton et al. ...................... 204/2.1
3,644,146 2/1972 Bergum ............................ 204/130 X
3,753,779 8/1973 Franks et al. ...................... 204/130 X
3,880,672 4/1975 Megahed et al. ..................... 429/206
4,009,056 2/1977 Megahed et al. ................. 429/229 X Primary Examiner—Anthony Skapars

[57] ABSTRACT

A zinc-silver oxide dry cell comprises a zinc anode, a silver oxide cathode, an immobilized body interposed between the anode and the cathode, and a metallic silver layer formed at least on the anode side surface of the cathode by reduction of silver oxide. Reduction of the siver oxide to form the metallic cathode layer on the cathode surface is effected by causing a reducing agent to contact with the cathode surface or by subjecting the cathode surface to a heat treatment, electrolysis or a mechanical force.

5 Claims, 9 Drawing Figures

ALKALINE DRY CELL

BACKGROUND OF THE INVENTION

This invention relates to an improved alkaline dry cell comprising in combination a zinc anode, a monovalent silver oxide cathode and an alkaline electrolyte, and in particular an improvement in a cathode for the alkaline dry cell.

A conventional dry cell contains a silver oxide ($Ag_2O$) as an active ingredient. In such a conventional dry cell, a silver oxide is a poor non-conductor showing, for example, a greater resistance of about $10^8 \Omega cm$. For this reason, an electroconductive ingredient such as graphite is added to a monovalent silver oxide ($Ag_2O$) as shown in U.S. Pat. No. 3,427,204 so as to enhance electroconductivity. In order to obtain necessary electroconductivity from the standpoint of the characteristic of the dry cell, use is generally made of a cathode obtained by compressing a composition comprising 95 parts of silver oxide, 4.5 parts of graphite and 0.5 part of a binder under a pressure of 5 to 10 ton to form a pellet or a compressed coherent mass. The use of the graphite reduces an amount of silver oxide by that extent, when viewed based on the whole weight of the composition, resulting in a decreased discharge capacity. Therefore, difficulty is encountered in attaining high performance of a closed, compact button type cell in particular. Graphite shows a resistance of about $10^{-2} \Omega cm$. Since a great difference of resistance is observed between the graphite and the silver oxide, it is necessary to form a pellet by uniformly mixing each ingredient of the composition and compressing the mixture under a pressure. In actual practice, however, many difficulties are involved, since the graphite is smaller in true specific gravity than the silver oxide.

SUMMARY OF THE INVENTION

An object of this invention is to provide a zinc-silver oxide dry cell having a great discharge capacity.

Another object of this invention is to provide an alkaline dry cell including a silver oxide cathode depolarizer pellet of good conductivity and having no electroconductive ingredient such as graphite.

Another object of this invention is to provide a method for easily imparting an electroconductivity to a cathode pellet without lowering a discharge capacity.

According to this invention there is provided an alkaline primary cell comprising an anode containing zinc as an active ingredient, a cathode containing a silver oxide as an active ingredient, an immobilized body of an alkaline electrolyte interposed between the anode and the cathode, and a metallic silver layer formed at least on the anode side surface of the cathode by reduction of the silver oxide.

Reduction of the silver oxide is effected by causing a reducing agent to contact with the cathode or by subjecting the cathode to a heat treatment, electrolysis and a mechanical force.

DETAILED DESCRIPTION OF THE PREFERRED EMBODIMENT

An alkaline dry cell according to this invention will be explained below by referring to FIG. 1.

Figure 1:
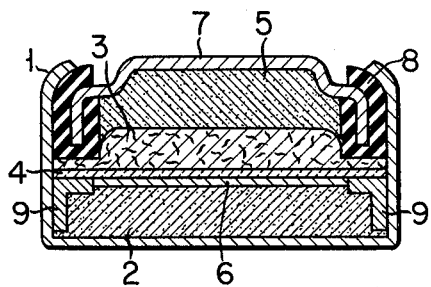
FIG. 1 is a cross-sectional view showing an alkaline primary cell according to one embodiment of this invention.

In FIG. 1, 1 shows a cup-like cathode vassel made of a nickel-plated iron plate.

Within the cathode vessel 1 is formed a cathode pellet 2 which is formed by charging a mixture of 99.5 parts by weight of a monovalent silver oxide as an active ingredient and 0.5 parts of a polystylene resin as a binder into the cathode vessel 1 and compressing it. An immobilized body 3 made of a nonwoven polyamide fiber cloth impregnated with an electrolyte of an aqueous potassium hydroxide solution is formed through a cellophane separator 4 on the cathode pellet 2 and a gelatinized zinc anode 5 is formed on the immobilized body 3. A metallic silver layer 6 is formed at least on that surface of the cathode pellet 2 where it contacts with the cellophane separator 4. 7 shows an anode cap made of a steel plate and having a nickel-plated outer surface and a tin-or copper-plated inner surface. The anode cap 7 is sealed by a sealing gasket 8 made of polyamide.

9 is a metal ring acting as a collector for the cathode pellet 2. The metallic silver layer 6 is formed by imparting a reducing agent such as hydrazine hydrate, formalin and hydroxylamine to the anode side surface of the cathode pellet. For example, when the cathode pellet 2 compressed into the cathode vessel 1 having a metal ring 9 incorporated therein is immersed for 1 hour into a 0.5% hydrazine hydrate alcoholic solution, a desired metallic silver layer 6 is formed. Reduction of the silver oxide by the hydrazine hydrate is represented by the following reaction equation:

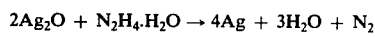

$$2Ag_2O + N_2H_4.H_2O \rightarrow 4Ag + 3H_2O + N_2$$

The contact of the reducing agent with the silver oxide can be effected in the other methods. For example, the reducing agent may be blown directly to the cathode pellet or may be contacted in a vapor form with the cathode pellet.

The metallic silver layer 6 may be formed by applying a heat to the anode side surface of the cathode pellet. For example, when an electric heater having a temperature of 220° to 350° C, preferably 300° to 350° C is contacted for 1 second with the exposed surface of the cathode pellet 2 compressed into the cathode vessel 1 having the metal ring incorporated therein, the silver oxide is reduced to form a metallic silver layer 6. A heat of 220° to 350° C may be applied, by a hot air blowing or by irradiation with an infrared ray, to the surface of the cathode pellet 2. The electric heater is selected from among ones having an outer diameter greater then the inner diameter of the metallic ring 9 and smaller than the inner diameter of the cathode vessel 1.

The metallic silver layer 6 can be formed by electrolyzing the anode side surface of the cathode pellet. The following explanation is directed to a method for reducing the silver oxide by an electrolysis and to the characteristics of a G13 type alkaline dry cell (JIS denomination) having a metallic silver layer 6 formed by this method.

A cathode pellet 2 compressed into the cathode vessel 1 was immersed in a 3% KOH solution and a terminal was taken out from the cathode vessel 1. As an opposing electrode, use was made of a platinum plate having a surface area (about 10 cm²) sufficiently wider than that surface area (about 0.65 cm²) of the cathode pellet 2 where a metallic silver layer 6 is formed. The platinum plate was immersed in a 30% KOH solution in a manner to oppose that surface area of the cathode pellet 2 where the metallic silver layer is formed. The interelectrode distance was 1 cm. With the terminal of the cathode pellet 2 connected to the negative electrode of a constant current power supply device and the terminal of the platinum connected to the positive electrode of the constant current power supply device a direct current of 1mA was passed for 6 minutes. At this time a voltage between the positive electrode and the negative electrode was 40V and the electrolytic current density was 1.54mA/cm². In this case, room temperature was used. As a result, that surface of the cathode pellet 2 which confronts the platinum plate was subjected to an electrolytic reduction to form a metallic silver layer 6. The silver oxide to be reduced had an electric capacity of 0.1mAH and a weight of 0.00044g. At this time an amount of reduction was to the extent not exerting a great influence on an electric discharge capacity. Within this limit an increase in the amount of reduction contributed much to the performance of a cell. With the JIS G13 cell having a to-be-electrolytically-reduced silver oxide whose electric capacity was 0.1mAH it was possible to satisfactorily obtain a maximum allowable discharge current of 6mA. The current density can vary dependent upon a necessary amount of reduction, while having a correlation with the electrolyzing time. With the JIS G13 type cell, for example, the oxide silver oxide was 0.0001% reduced based on the whole weight of the silver oxide by electrolytically reducing the silver oxide for 25.5 minutes with the electrolytic reduction current density of 0.001 mA/cm². Where the silver oxide is 0.1% reduced electrolytically based on the whole weight of the silver oxide in the cathode, it is only necessary that electrolysis be effected for 51 minutes with the electrolytic reduction current density of 5.0 mA/cm².

The metallic silver layer 6 can be formed by applying a mechanical force to the anode side surface of the cathode pellet. For example, the surface of the cathode pellet 2 be rubbed by a stainless rod. In this case a methode is adopted in which a 9mm diameter stainless steel rod is rotated at 500 RPM in a manner that it is pressed under a pressure of 200 kg/cm² to the surface of the cathode pellet. Alternatively, the surface of the cathode pellet of struck with the stainless steel rod so that a pressure of 5 to 10 ton/cm² is applied to the cathode pellet surface. With an excess repetitive striking of the cathode pellet surface, however, particles of a produced metallic silver forms a close-packed metallic silver film due to the elongation of the metallic silver and after assembly of a cell the formed metallic silver film prevents penetration of an alkaline electrolyte with the result that the characteristic of the cell is extremely lowered. This invention will be more fully understood from the examples which follow.

EXAMPLE 1

Table 1 shows a comparison in characteristics between a conventional dry cell and an alkaline dry cell according to this invention which has a metallic silver layer formed on the surface of a cathode pellet using a reducing agent (hydrazine hydrate). In Table 1 the dry cell according to this invention is substantially the same as in FIG. 1. The conventional dry cell is substantially similar to that shown in FIG. 1 except that a cathode pellet contains graphite and that no metallic silver layer is formed on the cathode pellet. Both the dry cells belong to the JIS (Japanese Industrial Standard) G13 type and have a diameter of 11.6mm and a height of 5.4mm.

Table 1

| Comparison item | | This invention (A) | Prior art (B) |
| --- | --- | --- | --- |
| Composition of cathode pellet | Silver oxide (Ag₂O) | 99.5 parts | 95 parts |
| | electroconductive ingredient (graphite) | 0 | 4.5 parts |
| | binder (polystyrene resin) | 0.5 part | 0.5 part |
| Weight of cathode pellet | | 1.2 g | 1.0 g |
| Weight of silver oxide in cathode pellet composition | | 1.194 g | 0.95 g |
| Theoretical electrical capacity of silver oxide in cathode pellet composition | | 275.8 mAH | 219.5 mAH |
| Electrical resistance from the top surface of the cathode pellet up to the outer surface of the cathode vessel (*) | | 5 to 7 Ω | 8 to 10 Ω |
| Open circuit voltage | | 1.58 V | 1.58 V |
| Short circuit current | | 0.80 A | 0.65 A |
| Impedance (1K.Z AC frequence) | | 2.0 Ω | 2.3 Ω |
| Discharge capacity (Total End Voltage 1.2 V) | 20° C 5000Ω continuous discharge | 253 mAH | 190 mAH |
| | 20° C 500Ω continuous discharge | 200 mAH | 155 mAH |
| | 20° C 150Ω continuous discharge | 176 mAH | 140 mAH |

(*) A nickel-plated steel rod with a diameter of 3 mm was contacted under a pressure of 5kg/cm² with the central top surface portion of a cathode pellet with a diameter of 11 mm and a thickness of 2mm and electrical resistance between the bottom of a cathode vessel and the steel rod was measured using a DC resistance meter.

EXAMPLE 2

An alkaline dry cell of this Example is substantially the same as in Example 1 except that a metallic silver layer is formed on the surface of a cathode pellet using a heat from an electric heater. This alkaline dry cell is compared in characteristics with the conventional dry cell in Example 1 as shown in Table 2.

Table 2

| Comparison item | | This invention (A) | Prior art (B) |
| --- | --- | --- | --- |
| Composition of cathode pellet | Silver oxide (Ag₂O) | 99.5 parts | 95 parts |
| | electroconductive ingredient (graphite) | 0 | 4.5 parts |
| | binder (polystyrene resin) | 0.5 part | 0.5 part |
| Weight of cathode pellet | | 1.2 g | 1.0 g |
| Weight of silver oxide in cathode pellet composition | | 1.194 g | 0.95 g |
| Theoretical electrical capacity of silver oxide in cathode pellet composition | | 275.8 mAH | 219.5 mAH |
| Electrical resistance from the top surface of the cathode pellet up to the outer surface of the cathode vessel (*) | | 5 to 7 Ω | 8 to 10 Ω |
| Open circuit voltage | | 1.58 V | 1.58 V |
| Short circuit current | | 0.80 A | 0.65 A |
| Impedance (1K.Z AC frequence) | | 2.1 Ω | 2.3 Ω |
| Discharge capacity (Total End Voltage 1.2 V) | 20° C 5000Ω continuous discharge | 252 mAH | 191 mAH |
| | 20° C 500Ω continuous discharge | 198 mAH | 155 mAH |
| | 20° C 150Ω continuous discharge | 175 mAH | 140 mAH |

(*) A nickel-plated steel rod with a diameter of 3 mm was contacted under a pressure of 5kg/cm² with the central top surface portion of a cathode pellet with a diameter of 11 mm and a thickness of 2mm and electrical resistance between the bottom of a cathode vessel and the steel rod was measured using a DC resistance meter.

EXAMPLE 3

An alkaline dry cell of this Example is substantially the same as in Example 1 except that a metallic silver layer is formed on the surface of a cathode pellet by electrolysis. This dry cell is compared in characteristics between the conventional dry cell in Example 1, as shown in Table 3.

Table 3

| Comparison item | | This invention (A) | Prior art (B) |
|---|---|---|---|
| Composition of cathode pellet | Silver oxide ($Ag_2O$) | 99.5 parts | 95 parts |
| | electroconductive ingredient (graphite) | 0 | 4.5 parts |
| | binder (polystyrene resin) | 0.5 part | 0.5 part |
| Weight of cathode pellet | | 1.2 g | 1.0 g |
| Weight of silver oxide in cathode pellet composition | | 1.194 g | 0.95 g |
| Weight of silver oxide in cathode pellet composition after reduction | | 1.193 g | 0.95 g |
| Theoretical electrical capacity | | 276.1 mAH | 219.5 mAH |
| Electrical resistance from the top surface of the cathode pellet up to the outer surface of the cathode vessel (*) | | 5 to 8 Ω | 8 to 10 Ω |
| Open circuit voltage | | 1.58 V | 1.58 V |
| Short circuit current | | 0.69 A | 0.65 A |
| Impedance (1K.Z AC frequence) | | 2.1 Ω | 2.3 Ω |
| Discharge capacity (Total End Voltage 1.2 V) | 20° C 5000Ω continuous discharge | 251 mAH | 190 mAH |
| | 20° C 500Ω continuous discharge | 200 mAH | 155 mAH |
| | 20° C 150Ω continuous discharge | 173 mAH | 140 mAH |

(*) A nickel-plated steel rod with a diameter of 3 mm was contacted under a pressure of 5kg/cm² with the central top surface portion of a cathode pellet with a diameter of 11 mm and a thickness of 2mm and electrical resistance between the bottom of a cathode vessel and the steel rod was measured using a DC resistance meter.

EXAMPLE 4

An alkaline dry cell of this Example is substantially the same as in Example 1 except that a metallic silver layer is formed by rubbing the surface of a cathode pellet with a stainless steel rod. This dry cell is compared in characteristics with the conventional dry cell in Example 1, as shown in Table 4.

Table 4

| Comparison item | | This invention (A) | Prior art (B) |
|---|---|---|---|
| Composition of cathode pellet | Silver oxide ($Ag_2O$) | 99.5 parts | 95 parts |
| | electroconductive ingredient (graphite) | 0 | 4.5 parts |
| | binder (polystyrene resin) | 0.5 part | 0.5 part |
| Weight of cathode pellet | | 1.2 g | 1.0 g |
| Weight of silver oxide in cathode pellet composition | | 1.194 g | 0.95 g |
| Theoretical electrical capacity of silver oxide in cathode pellet composition | | 275.8 mAH | 219.5 mAH |
| Open circuit voltage | | 1.58 V | 1.58 V |
| Discharge capacity (Total End Voltage 1.2 V) | 20° C 15000Ω continuous discharge | 259 mAH | 192 mAH |
| | 20° C 5000Ω continuous discharge | 254 mAH | 190 mAH |

Figure 2:
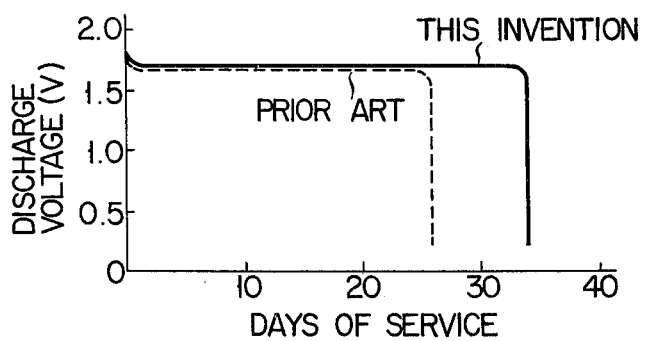
FIGS. 2 to 9 are characteristic curves each showing a comparison in discharge characteristics between a zinc-silver oxide cell according to this invention and a conventional counterpart.
Figure 3:
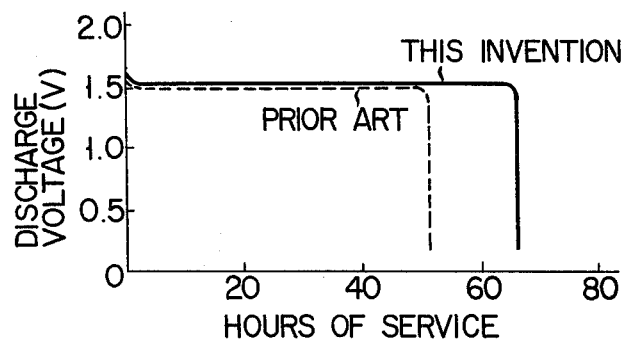

FIGS. 2 and 3 are characteristic curves of the dry cells shown in Table 1. FIG. 2 shows a comparison between the dry cell according to this invention and the conventional dry cell when a continuous discharge is effected at 20° C and 5000Ω, whereas FIG. 3 shows a comparison between the dry cell of this invention and the conventional dry cell when a continuous discharge is effected at 20° C and 500Ω.

Figure 4:
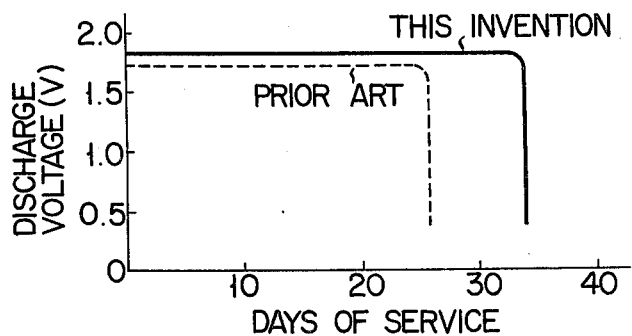
Figure 5:
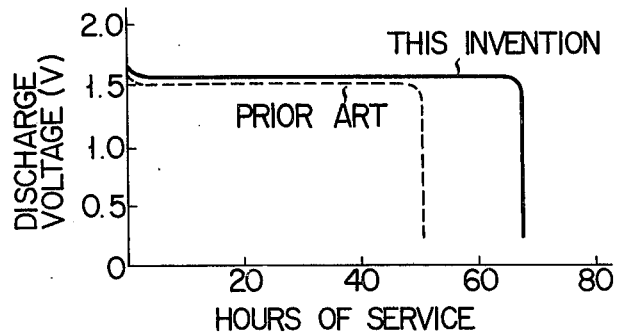

FIGS. 4 and 5 are characteristic curves of the dry cells shown in Table 2. FIG. 4 shows a comparison between the dry cell this invention and the conventional dry cell when a continuous discharge is effected at 20° C and 5000Ω and FIG. 5 shows a comparison between the dry cell of this invention and the conventional dry cell when a continuous discharge is effected at 20° C and 500Ω.

Figure 6:
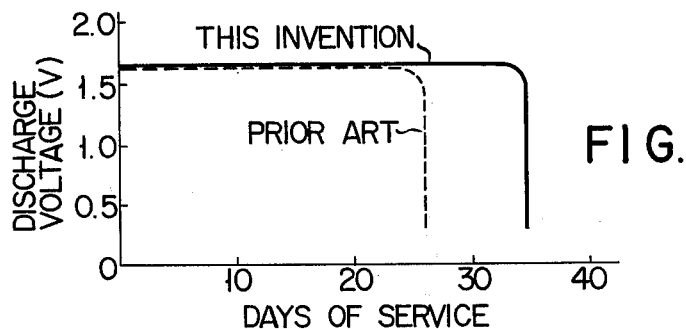
Figure 7:
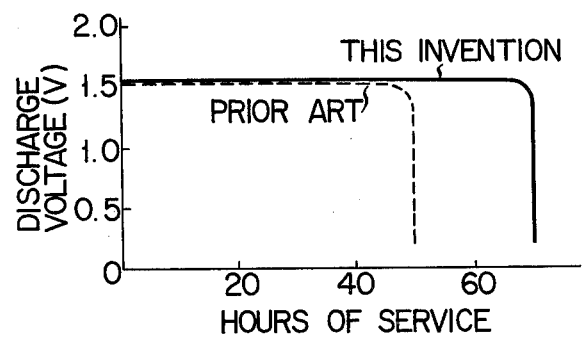

FIGS. 6 and 7 are characteristic curves of the dry cells shown in Table 3. FIG. 6 shows a comparison between the dry cell of this invention and the conventional dry cell when a continuous discharge is effected at 20° C and 5000Ω and FIG. 7 shows a comparison between the dry cell according to this invention and the conventional dry cell when a continuous discharge is carried out at 20° C and 500Ω.

Figure 8:
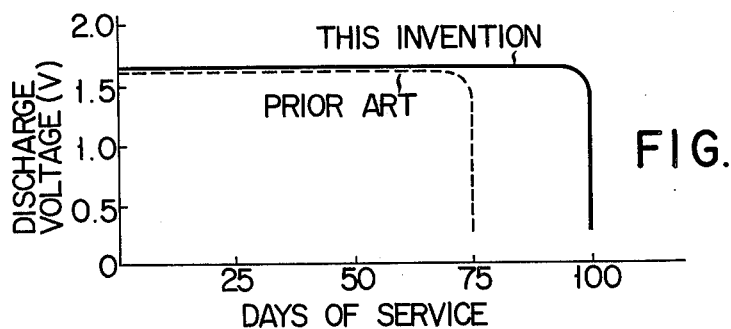
Figure 9:
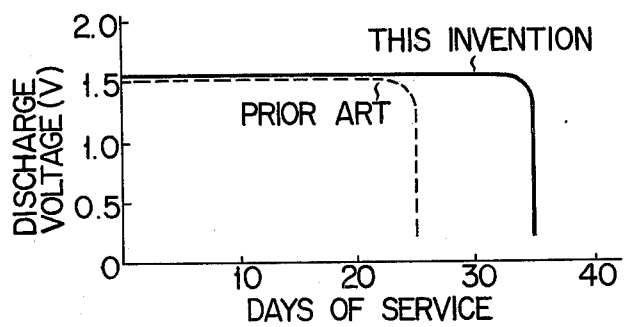

FIGS. 8 and 9 are characteristic curves of the dry cells shown in Table 4. FIG. 8 shows a comparison between the dry cell of this invention and the conventional dry cell when a continuous discharge is conducted at 20° C and 15000Ω and FIG. 9 shows a comparison between the dry cell of this invention and the conventional dry cell when a continuous discharge is effected at 20° C and 5000Ω.

As will be evident from the Tables 1 to 4, the cathode pellet of this invention shows a smaller electrical resistance than that in the conventional alkaline dry cell and, in consequence, the electroconductivity is excellent. It is also evident that, as compared with the conventional alkaline dry cell, the alkaline dry cell of this invention provides increased short-circuit current and increased discharge capacity.

From these FIGS. 2 to 9 it will appreciated that the alkaline dry cell of this invention exhibits excellent discharge characteristics in comparison with the conventional counterpart. Since according to this invention the metallic silver layer formed on at least the anode side surface of the cathode pellet serves as an electroconductive ingredient, it is unnecessary to add graphite to the silver oxide as with the case with the conventional cathode pellet. This makes it possible to increase an amount of silver oxide, which is an active ingredient for the cathode, as compared with that required in the prior art. As a result, the discharge capacity can be correspondingly increased according to this invention.

What we claim is:

1. An alkaline dry cell comprising an anode containing zinc as an active ingredient; a cathode containing monovalent silver oxide as an active ingredient; an immobilized body of an alkaline electrolyte interposed between said anode and said cathode; and a metallic silver layer formed at least on the anode side surface of said cathode by reduction of silver oxide, the reduction being effected by causing a reducing agent to contact with the cathode.

2. An alkaline dry cell according to claim 1 in which said reduction is effected by subjecting the cathode to a heat treatment.

3. An alkaline dry cell according to claim 1 in which said reducing agent is selected from the group consisting of hydrazine hydrate, formaline and hydroxylamine.

4. An alkaline dry cell according to claim 2, in which said heat treatment is effected at a temperature of 220° to 350° C.

5. An alkaline dry cell according to claim 4 in which said heat treatment is effected by one means selected from the group consisting of an electric heater, infrared ray and hot air.

* * * * *